US 6,712,506 B2

(12) United States Patent
Pantigny

(10) Patent No.: US 6,712,506 B2
(45) Date of Patent: Mar. 30, 2004

(54) READER FOR ELECTROMAGNETIC RADIATION DETECTION ELEMENT, SENSOR, AND THE CORRESPONDING READ PROCESS

(75) Inventor: Philippe Pantigny, Claix (FR)

(73) Assignee: Commissariat a l'Energie Atomique (FR)

( * ) Notice: Subject to any disclaimer, the term of this patent is extended or adjusted under 35 U.S.C. 154(b) by 0 days.

(21) Appl. No.: 10/148,811

(22) PCT Filed: Oct. 22, 2001

(86) PCT No.: PCT/FR01/03274

§ 371 (c)(1),
(2), (4) Date: Jun. 5, 2002

(87) PCT Pub. No.: WO02/35828

PCT Pub. Date: May 2, 2002

(65) Prior Publication Data

US 2003/0001591 A1 Jan. 2, 2003

(30) Foreign Application Priority Data

Oct. 23, 2000 (FR) .............................................. 00 13543

(51) Int. Cl.⁷ .......................... G01K 7/00; G01K 13/00; H01L 31/00
(52) U.S. Cl. .................... 374/183; 374/141; 250/214 A
(58) Field of Search ................................. 374/183, 141; 250/208.1, 214 A, 214 LA, 214 AG, 214 DC, 214 C, 214 R

(56) References Cited

U.S. PATENT DOCUMENTS

| | | | | | |
|---|---|---|---|---|---|
| 4,323,774 A | * | 4/1982 | Kopp | .................. | 250/214 A |
| 5,214,274 A | * | 5/1993 | Yang | .................. | 250/208.1 |
| 5,367,154 A | * | 11/1994 | Pfeiffer | .................. | 250/208.1 |
| 5,665,959 A | * | 9/1997 | Fossum et al. | .......... | 250/208.1 |
| 5,808,677 A | * | 9/1998 | Yonemoto | .................. | 250/208.1 |
| 5,812,030 A | * | 9/1998 | Inami et al. | ............ | 250/214 A |
| 6,031,217 A | * | 2/2000 | Aswell et al. | ........... | 250/208.1 |
| 6,229,133 B1 | * | 5/2001 | Hynecek | .................. | 250/208.1 |
| 6,229,134 B1 | * | 5/2001 | Ang et al. | ............... | 250/208.1 |
| 6,350,981 B1 | * | 2/2002 | Uno | .................... | 250/208.1 |
| 6,417,504 B1 | * | 7/2002 | Kozlowski | ............... | 250/208.1 |
| 6,518,558 B1 | * | 2/2003 | Böhm et al. | ............. | 250/208.1 |
| 2003/0107666 A1 | * | 6/2003 | Harton et al. | ................ | 348/310 |

OTHER PUBLICATIONS

Lule et al., "100,000 Pixel 120dB Imager in TFA–Technology", 1999 Symposium on VLSI Circuits, Digest of Technical Papers, Kyoto, Jun. 17–19, 1999, Symposium on VLSI Circuits, New York, NY: IEEE, US vol. Conf. 13, Jun 17, 1999, pp. 133–136.

* cited by examiner

Primary Examiner—Diego Gutierrez
Assistant Examiner—Mirellys Jagan
(74) Attorney, Agent, or Firm—Harness, Dickey & Pierce, P.L.C.

(57) ABSTRACT

The invention relates to a reader for an electromagnetic radiation detection element comprising:
  at least one integration capacitor (16) to integrate electrical charges output by the said detection element,
  an amplifier (18) with a high impedance terminal (20) connected to the integration capacitor (16) and a low impedance terminal connected to an output stage (22), and
  means (24, 27) of isolating the integration capacitor (16) from the detection element when the capacitor voltage exceeds a set value.

According to the invention, the comparator means are connected to the low impedance terminal (50) of the amplifier (18).

Application to sensors in matrices.

11 Claims, 2 Drawing Sheets

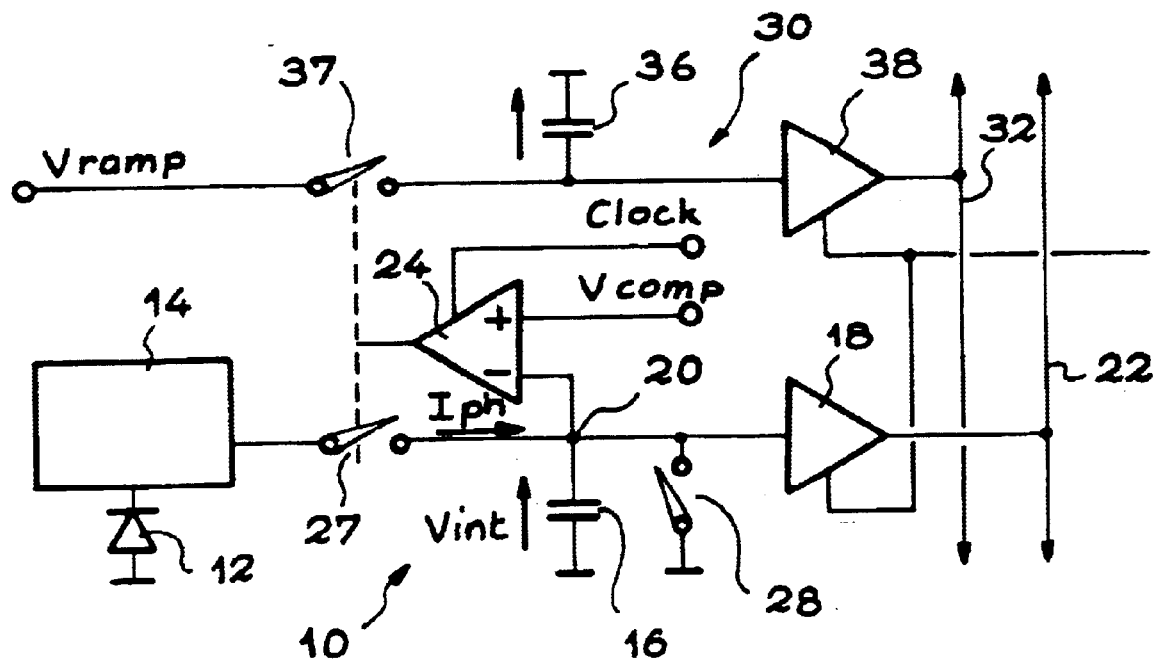
Prior Art  FIG. 1
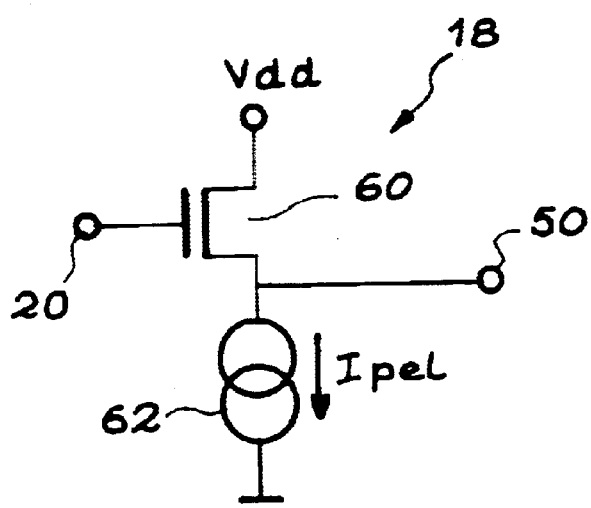
FIG. 3

READER FOR ELECTROMAGNETIC RADIATION DETECTION ELEMENT, SENSOR, AND THE CORRESPONDING READ PROCESS

DESCRIPTION

1. Technical Field

This presentation discloses an invention relating to a reader for an electromagnetic radiation detection element and an image sensor including such a reader. The invention also relates to a read process that could be implemented by this reader.

An image reader means a device capable of transforming an electronic signal supplied by one or several electromagnetic radiation detection elements into a signal that can be used to represent or record an image, or at least an element of an image (pixel).

The invention is used for applications in different types of image sensors, for example such as cameras. These image sensors may be equipped with detection elements in the form of field effect diodes or elements (MOSFET). In particular, the invention may be used for devices equipped with a sensitive retina integrated in thin layers (TFA Thin Film on Asic).

The invention is also used for applications in the instrumentation (spectroscopic, etc.) and robotics (sensors) fields.

2. State of the Art

The state of the art closest to the invention is described in document (1), for which the complete reference is given at the end of the description. It is also illustrated in FIG. 1, extracted from document (1) and described below to facilitate understanding of the rest of the presentation.

FIG. 1 shows an electrical diagram of a reader 10 associated with an electromagnetic radiation detection element. The detection element shown in the form of a diode 12 is associated with an impedance matching circuit 14 or an input stage, designed essentially to polarize the diode and collect the charges that are generated in it by radiation. The detection element, in the event diode 12, is capable of converting electromagnetic radiation, for example visible or infrared light, or y radiation, into a current of electrical charges. The charge current denoted $I_{ph}$ in the figure is transmitted through the impedance matching circuit 14 to the reader 10 itself. (The reader 10 is usually also called the preamplifier-integrator).

The reader 10 comprises integration means in the form of a capacitor 16. The capacitor is charged by the electronic current $I_{ph}$ in an integration phase and there is a voltage denoted $V_{int}$ at its terminals. The voltage $V_{int}$ represents the intensity of the radiation flux received by the detection element during the integration phase.

An amplifier 18 connected to a terminal 20 of the capacitor 16 supplies a detection signal that varies linearly with the voltage $V_{int}$. The amplifier in particular connects the terminal 20 of the capacitor to a read signal bus 22. The bus 22 is considered as being a constituent of an output stage from the reader or as forming part of such an output stage.

The terminal 20 of the capacitor 16 is also connected to the inverter input of a comparator 24. The comparator is designed to compare the voltage $V_{int}$ with a set voltage $V_{comp}$ and to control opening of a switch 27 when the voltage $V_{int}$ goes above the set voltage threshold $V_{comp}$. When the switch 26 is open, the reader 10 is isolated from the detection element 12.

Opening the switch 27 also interrupts integration of the current in the capacitor 16, and prevents a reader saturation phenomenon when the radiation flux received by the detection element is very intense.

It can be seen that the rate of the comparator 24 is controlled by a "Clock" signal such that opening the switch 26 also has to be validated by a synchronization pulse.

Synchronization pulses are also produced for initialization of the reader before each new integration phase. These pulses then temporarily close a switch 28 connected between the terminals of the capacitor 16, to discharge it.

According to one interesting feature of the reader, it also comprises a timed indication stage 30 capable of outputting a signal representing the duration of each integration phase. Essentially, this signal is provided by a second capacitor 36 connected to a time signal bus 32 through an amplifier 38. The capacitor 36 is connected to a charge voltage source $V_{ramp}$ through a switch 37, which is also opened under the control of the comparator 24.

By combining the sampled voltage blocked by the time indication stage 30 (integration time $T_{int}$) and the voltage integrated in the capacitor 16 (integrated photocharge $Q_{int}$), it is then possible to obtain the value $$I_{ph} = \frac{Q_{int}}{T_{int}}$$

and consequently the incident flux.

A more complete description of the operation of the device in FIG. 1 is given in document (1) mentioned above, although it is not necessary for a good understanding of the invention.

Image sensors equipped with a device like that described above can significantly increase the speed at which images are taken.

PRESENTATION OF THE INVENTION

The purpose of the invention is to propose a reader operating essentially on the principle of the reader described above, and which has improved operating characteristics.

One purpose in particular is to propose such a reader with low reading noise.

Another purpose is to propose such a reader with improved sensitivity.

There is another purpose related to the previous purpose, which is to propose such a reader that can operate with a low capacity integration capacitor, and that can therefore reduce the surface area of the integration capacitor.

Another purpose of the invention is to propose a read process and a sensor, or detection device, using one or several readers conform with the invention.

In order to achieve these purposes, more precisely the invention relates to a reader for an electromagnetic radiation detection element comprising:

at least one electrical charge integration capacitor that can be connected to at least one electromagnetic radiation detection element, to output a voltage that it is a function of the electrical charges supplied by the said detection element, an amplifier connected between the capacitor and an output stage from the reader, the amplifier having a high impedance terminal connected to the integration capacitor and a low impedance terminal connected to the output stage, and comparator means for isolating the integration capacitor from the detection element when the voltage at the capacitor terminals is greater than a set value.

According to the invention, the comparator means are connected to the low impedance terminal of the amplifier.

Since the comparator means are connected to the low impedance terminal of the amplifier, in other words to the terminal connected to the output stage, their input capacitance is not in parallel with the integration capacitor. The result is an increase in the current-voltage conversion factor, creating better sensitivity.

The available voltage at the output from the amplifier reflects the voltage at the capacitor terminals. Therefore, it is used to determine whether or not it exceeds a given value.

Furthermore, the amplifier does not amplify an input noise inherent to the comparator means and to a comparison voltage source applied to these means, if any. This can significantly reduce noise transferred to the output stage.

According to an improvement to the reader, a switch can be connected between the low impedance terminal of the amplifier and the comparator means, to connect the comparator means to the amplifier during an integration phase and to isolate the comparator means from the amplifier during a read phase.

Due to this improvement, the comparator means may be completely isolated from the amplifier and from the output stage to protect the output stage from noise generated by these means.

According to another improvement of the reader, an additional switch may be connected between the amplifier and the output stage, to connect the output stage to the amplifier in a read phase and to isolate the output stage from the amplifier in an integration phase.

This improvement has a number of advantages.

During the integration phase, the low impedance output from the reader is charged solely by the input capacitance in the low capacitance comparator, which gives a low reader polarization current and hence low consumption of the device. On the other end, during the read phase, the low impedance output of the reader is connected to the output stage through a high capacitance bus. The result is a high polarization current to charge the output stage, but only for a short instant.

The final result is a reduction in the electrical consumption.

A reader according to the invention may be common to several radiation detection elements. However, it is preferable to associate an individual reader with each image sensor detection element. One possibility for high level integration of the reader made available as a result of the invention, is that radiation detection elements and readers can be associated with each other. They are associated in a retina in which each elementary point comprises a detection element and a reader.

In one particular embodiment of the amplifier used to apply an input to the output stage, the output stage may be built around a field effect transistor polarized as a follower source. The transistor is polarized by a low intensity polarization current source and may be connected elsewhere to a read bus that forms the output stage, or at least part of it. In this case, the polarization current source is connected in parallel with a polarization source of the read bus, if any.

The invention also relates to a process for reading a detection element, for example a quantic or thermal detection element, using a reader like that described. The process comprises an alternating succession of integration phases and read phases. The comparator means are connected to the amplifier during integration phases, and the comparator means are isolated during read phases.

According to another aspect, it is also possible to connect the amplifier to the output stage during read phases, and to isolate it from the output stage during integration phases, either as a complementary or alternative feature.

Other characteristics and advantages of the invention will become clear from the following description with reference to the figures in the attached drawings. This description is given for illustrative purposes only and is in no way limitative.

BRIEF DESCRIPTION OF THE DRAWINGS

FIG. 1, already described, diagrammatically shows a reader associated with a detection element. This is a state of the art reader.

FIG. 3 shows a particular implementation of amplification means of a reader according to the invention.

DETAILED DESCRIPTION OF EMBODIMENTS OF THE INVENTION

Figure 2:
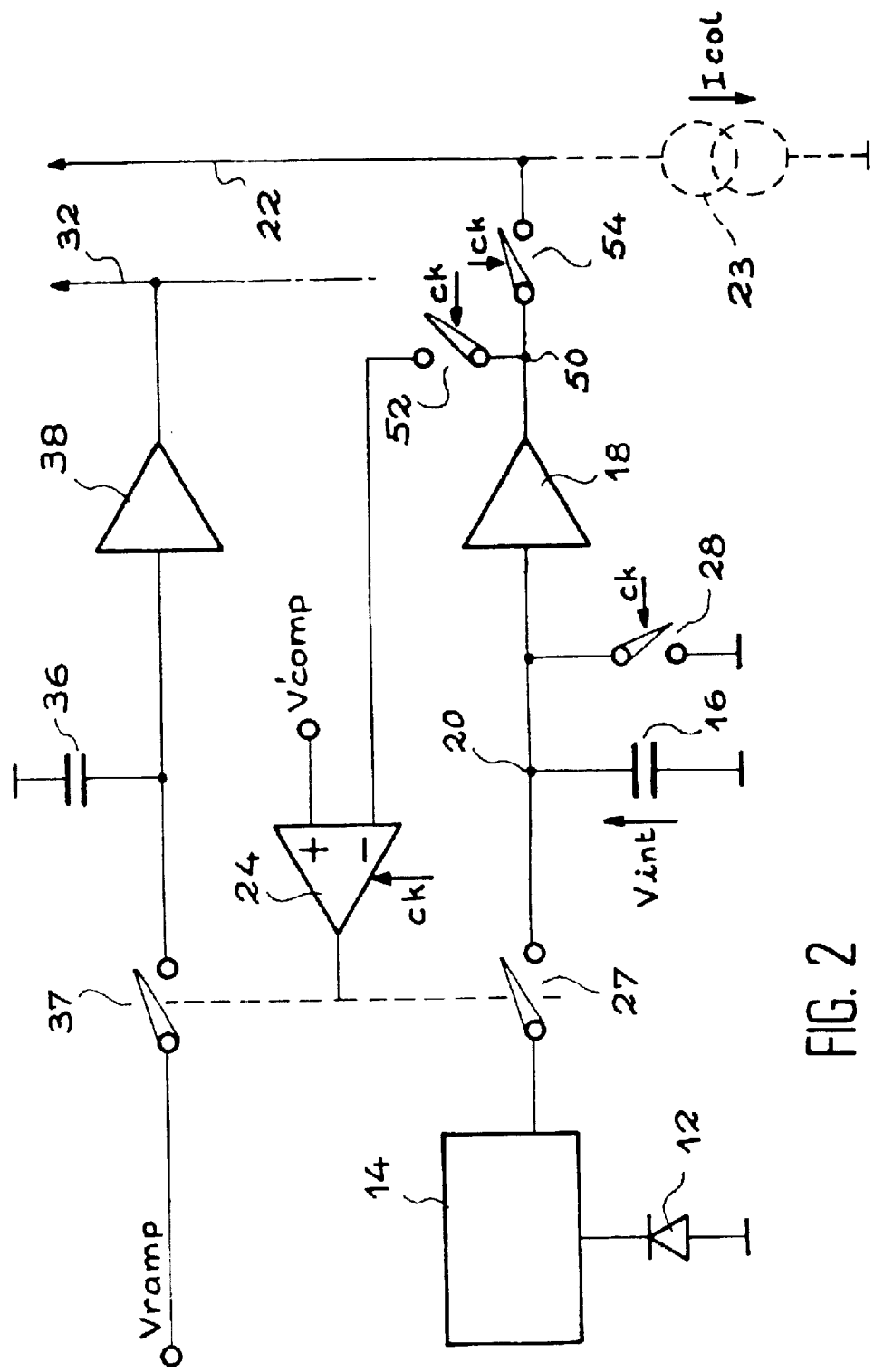
FIG. 2 diagrammatically shows a pixel in an image sensor built up with a reader according to the invention.

A large number of elements in FIG. 2 are identical to or similar to the elements shown in FIG. 1, already described. A complete description of the circuit in FIG. 2 and its components is not repeated here. Identical or similar parts are marked with the same references, in order to facilitate the reference to explanations that have already been given in the previous part of the text.

It can be seen that the comparator 24 mentioned above is connected to a low impedance output terminal 50 of the amplifier 18, instead of being connected to the terminal 20 of the integration capacitor 16.

It should be remembered that the comparison voltage $V'_{comp}$ applied to the comparator 24 is different from the voltage $V_{comp}$ applied to the comparator in FIG. 1. The voltage $V'_{comp}$ applied to the comparator 24 in FIG. 2 must take account of the transfer characteristic of the amplifier 18.

In this case, the amplifier 18 performs two functions. Obviously, a first function is to modify the output level of the reader characterized by the amplification gain. A second function is impedance matching. The impedance of an input terminal 20 of the amplifier 18 is higher than the impedance of an output terminal 50. The input and output terminals are thus denoted as the high impedance and low impedance terminals respectively.

By connecting the comparator 24 to a low impedance terminal of the amplifier 18, the noise associated with reading the voltage $V_{int}$ of the capacitor 16 can be reduced. Furthermore, injection of charges from the detection element 12, 14 into a parasite input capacitance of the comparator 24 can be avoided.

The reader in FIG. 2 comprises two additional switches 52 and 54, apart from the switches 27 and 37 already described in relation with FIG. 1.

The first additional switch 52 is connected between the comparator 24 and the low impedance terminal 50 of the amplifier. When the switch 52 is open, it completely isolates the comparator from the amplifier, and also from the output stage. In the example in the figure, the output stage is formed by the read signal bus 22. This measurement eliminates all noise that could be generated by the comparator from the reading.

The second additional switch 54 is connected between the low impedance terminal of the amplifier 18 and the read bus 22. Its first role is to prevent a short circuit between all low impedance terminals of the readers connected to the same bus 22. A second role of this switch is related to a reduction in the energy consumption of the reader. It will be described more clearly in the reminder of the description.

The rate at which the reader operates is controlled by a clock synchronization circuit that is only shown symbolically on the figures by arrows marked Ck. Operation essentially includes two phases, namely the integration phase and the read phase. During the integration phase, the current $I_{ph}$ charges the capacitor 16, at least until the switches 27 and 37 mentioned above with reference to FIG. 1 are open. The voltage $V_{int}$, available at the capacitor terminals and amplified by the amplifier 18, is read during the read phase, in other words is transferred onto the read bus 22. Similarly, the voltage at the capacitor terminals 36 is read on the bus of the time signal 32. An additional initialization phase may also be distinguished in which the charges accumulated in the capacitors 16 and 36 are eliminated.

Table I below shows the switching state of the different switches. These switches are marked simply by their reference corresponding to the figures.

TABLE I

| Switch | Integration phase | Read phase | Initialization |
|---|---|---|---|
| Switch 52 | closed | open | indifferent |
| Switch 54 | open | closed | indifferent |
| Switch 28 | open | open | closed |
| Switches 27 and 37 | closed if $V_{int} < V_{comp}$ | open | indifferent |

Operation of the time indication stage 30 is exactly the same as the operation shown in FIG. 1. A stage of this type is described in document (1), mentioned above, which should be referred to. In particular, it can be noted that the capacitor 36 of stage 30 is charged by a voltage ramp generator, also during the integration phase.

FIG. 3 described below shows a particular embodiment of the amplifier 18 used in the reader according to the invention.

According to FIG. 3, the amplifier 18 comprises a transistor 60, the drain of which is connected to a power supply voltage denoted Vdd in which the grid is connected to a terminal 20 of the integration capacitor, and the source of which is polarized by a current source 62. The transistor source is also connected to the terminal 50 to which the comparator 24 and the output stage 22 are connected.

The current source 62 outputs a low intensity current denoted $I_{pel}$. Since the second additional switch 54 is opened during the integration phase in order to avoid charging the read bus 22, the transistor 60 only carries a low intensity current $I_{pel}$. On the other hand, during the read phase, the switch 54 is closed and the current source 62 is in parallel with a polarization source of the read bus 22. This source, shown in discontinuous lines in FIG. 2, is marked with reference 23. It outputs a current $I_{col}$ with an intensity very much greater than $I_{pel}$. This source is input to the read bus with a matched compliance. Compliance means the ability to output a current that can be used to set up a signal in a given time on a given capacitive charge.

Due to these characteristics, the consumption of the amplification means and therefore the reader may be particularly low. A low consumption results in better integration of the components.

The reader according to the invention is particularly suitable for junction type detection elements of the MOS type or the charge transfer device type (CCD).

Document Mentioned (1)

100000 Pixel 120 dB Imager in TFA-Technology,

T. Lulé, H. Keller, M. Wagner, M. Böhm, 1999 Symposium on VLSI Circuits Digest of Technical Papers, pages 134 to 136.

What is claimed is:

1. A reader for at least one electromagnetic radiation detection element comprising:

an integration capacitor to integrate electrical charges that can be connected to said electromagnetic radiation detection element to output a voltage that is a function of the electrical charges output by said detection element, an amplifier with a high impedance terminal connected to said integration capacitor and a low impedance terminal connected to an output stage, and comparator means to isolate said integration capacitor from said detection element when the voltage at terminals of said capacitor is greater than a set value, characterized in that the comparator means are connected to the low impedance terminal of the amplifier.

2. The reader of claim 1, comprising a switch connected between the low impedance terminal of the amplifier and the comparator means to connect the comparator means to the amplifier during an integration phase, and to isolate the comparator means from the amplifier during a read phase.

3. The reader of claim 1, comprising a switch connected between the amplifier and the output stage to connect the output stage to the amplifier in a read phase and to isolate the output stage from the amplifier in an integration phase.

4. The reader of claim 1, also comprising means of indicating a duration of charge integration by said integration capacitor.

5. The reader of claim 1, in which the amplifier comprises a field effect transistor polarized into a follower source by a polarization current source.

6. The reader of claim 5, in which the polarization current source of the amplifier has an intensity ($I_{pel}$) which is lower than the intensity of a polarization current source of said output stage.

7. A sensor comprising several electromagnetic radiation detection elements and at least one reader according to claim 1.

8. A sensor according to claim 7, in which a respective said reader is connected to a respective said electromagnetic radiation detection element.

9. A sensor according to claim 7, in which the electromagnetic radiation detection elements are chosen from among quantic and thermal detectors.

10. A read process for an electromagnetic radiation detection element using a reader conform with claim 1, comprising an alternating succession of integration phases and read phases, in which the comparator means are connected to the amplifier during the integration phases and in which the comparator means are isolated from the amplifier during the read phases.

11. A process for reading an electromagnetic radiation detection element using a reader according to claim 1, comprising an alternating succession of integration phases and read phases, in which the amplifier is connected to the output stage during read phases and in which the amplifier is isolated from the output stage during the integration phases.

* * * * *